United States Patent Office 2,877,097
Patented Mar. 10, 1959

2,877,097

METHOD OF PURIFICATION OF SILICON COMPOUNDS

Guenter A. Wolff, Little Silver, N. J.

No Drawing. Application May 6, 1958
Serial No. 733,451

5 Claims. (Cl. 23—205)

(Granted under Title 35, U. S. Code (1952), sec. 266)

The invention described herein may be manufactured and used by or for the Government for governmental purposes without the payment of any royalty thereon.

This application is a continuation-in-part of copending application Serial No. 595,802, filed July 3, 1956, now Patent No. 2,857,249.

This invention relates to a method of purifying silicon tetrachloride of traces of boron trichloride.

The conventional methods of purification of silicon compounds have proved to be successful for all impurities but boron. The reason for this failure is that according to the diagonal relationship of the periodic table both elements boron (B) and silicon (Si) or corresponding compounds such as their halides, e. g., chlorides ($BCl_3$, $SiCl_4$) bromides or fluorides differ only little in properties.

In the above-identified patent application there is described a method of purifying silicon tetrachloride ($SiCl_4$) of traces of boron trichloride ($BCl_3$) by adding to the silicon tetrachloride a nucleophilic amine of the structural formula $NR_3$ wherein R is an alkyl radical such as a methyl or ethyl group or a phenyl group. The nucleophilic tertiary amine reacts with the boron trichloride to form the molecular compound $Cl_3BNR_3$ of relatively low solubility or low vapor pressure with respect to the boron trichloride. Therefore, the resulting mixture can be separated by any conventional fractional distillation method into a volatile boron-free fraction and a boron-contaminated residue.

It now has been found that purification of silicon tetrachloride of traces of boron trichloride can be accomplished in a very simple and very efficient manner by using instead of a nucleophilic tertiary amine itself an anion exchange resin having attached to its hydrocarbon network nucleophilic tertiary amine groups ($—NR_2$) or nucleophilic quaternary ammonium groups ($—NR_3Cl$). The substituents R may be different in compounds or groups.

An ion exchange resin may be broadly defined as an elastic 3-dimensional hydrocarbon network or polymer chain to which is attached a large number of ionizable groups. For the purposes of the present invention the hydrocarbon networks or polymer chains of the vinyl type, particuarly those formed by the copolymerization of styrene and divinyl benzene are suited best provided they are insoluble in the liquid silicon tetrachloride. The following commercially available anion exchange resins have been particularly effective in carrying out the processes of the present invention:

"Dowex 3" made by "The Dow Chemical Company" and described in more detail in "Principles of Ion Exchange Processes," publication No. 1, 1954, of the above-mentioned company.

"Amberlite IRA–400 (Cl)" made by Rohm & Haas Company, Philadelphia, Pennsylvania, and constituting a strong basic anion exchange resin which derives its activity from quaternary ammonium groups. It is supplied as the chloride salt and is also available in chromatographic grade (a highly purified analytic grade resin).

"Amberlite IRA–401 (Cl)" is similar to the above-mentioned resin but of higher porosity.

The above-mentioned resins or similar anion exchange resins that are insoluble in silicon tetrachloride are used according to the invention for the purpose of purifying silicon tetrachloride of traces of boron trichloride by passing the contaminated silicon compound thru one or more columns containing one or more of the above-mentioned anion exchange resins in the manner illustrated in the following example:

*Example.*—A glass column of about 2 meter lengths and 3 centimeters in diameter is filled with an anion exchange resin of the type characterized above, for instance, a vinyl type resin having attached to its polymer chain a dialkylamine group such as the dimethylamine group $—N(CH_3)_2$. The liquid silicon tetrachloride to be purified of traces of boron chloride is passed thru the column at a slow rate. To attain complete purification a battery of such columns is preferably used.

Instead of passing the liquid silicon tetrachloride thru the column it is also possible to pass the silicon tetrachloride in gaseous form thru a battery of columns.

The spent nucleophilic anion exchange resin may of course be reactivated in the conventional manner by flushing it with organic solvents such as benzene, xylene, etc. To facilitate regeneration it is advantageous to add to these organic solutions tertiary amines such as trimethylamine or quaternary ammonium compounds which attach themselves to the polymer chain or hydrocarbon network of the original anion exchange resin.

The purified silicon tetrachloride may be transformed by the usual methods into silicon of transistor grade purity and is particularly valuable for applications where complete absence of boron is required.

It will be understood that the above-described processes are capable of many modifications and should not be limited to the specific examples given merely for the sake of illustrating the inventive idea as defined in the following claims.

What is claimed is:

1. Method of purifying silicon tetrachloride of traces of boron trichloride comprising passing the silicon tetrachloride to be purified thru absorption columns containing an anion exchange resin having attached to its polymer chain a radical selected from the group consisting of tertiary amine radicals ($—NR_2$) and quaternary ammonium radicals ($—NR_3Cl$) wherein R constitutes a member selected from the group consisting of alkyl and phenyl radicals.

2. Method of purifying silicon tetrachloride according to claim 1 in which the anion exchange resin consists essentially of a vinyl type resin having attached to its hydrocarbon network a nucleophilic tertiary amine of exchange character.

3. Method of purifying silicon tetrachloride according to claim 1 in which the anion exchange resin consists essentially of a vinyl type resin having attached to its hydrocarbon network a quaternary ammonium compound of exchange character.

4. Method of purifying silicon tetrachloride according to claim 1 in which the silicon tetrachloride is passed in liquid form thru columns filled with anion exchange resins.

5. Method of purifying silicon tetrachloride according to claim 1 in which the silicon tetrachloride is passed in the gaseous state thru columns filled with anion exchange resins.

References Cited in the file of this patent

UNITED STATES PATENTS

| | | |
|---|---|---|
| 2,167,358 | Gleason | July 25, 1939 |
| 2,400,874 | Burk | May 28, 1946 |
| 2,400,875 | Hughes | May 28, 1946 |